United States Patent
Bahu et al.

(10) Patent No.: US 10,060,709 B2
(45) Date of Patent: Aug. 28, 2018

(54) LIGHTWEIGHT HANDHELD ARMOR SHIELD

(71) Applicants: Joel Bishara Bahu, Ben Lomond, CA (US); Michael Berritto, III, Felton, CA (US)

(72) Inventors: Joel Bishara Bahu, Ben Lomond, CA (US); Michael Berritto, III, Felton, CA (US)

( * ) Notice: Subject to any disclaimer, the term of this patent is extended or adjusted under 35 U.S.C. 154(b) by 0 days.

(21) Appl. No.: 15/497,973

(22) Filed: Apr. 26, 2017

(65) Prior Publication Data

US 2017/0307339 A1    Oct. 26, 2017

Related U.S. Application Data

(60) Provisional application No. 62/327,813, filed on Apr. 26, 2016.

(51) Int. Cl.
*F41H 5/08* (2006.01)
*F41H 5/04* (2006.01)
*H04N 5/33* (2006.01)

(52) U.S. Cl.
CPC ............ *F41H 5/08* (2013.01); *F41H 5/0485* (2013.01); *H04N 5/33* (2013.01)

(58) Field of Classification Search
CPC ............ F41H 5/08; F41H 5/0485; F41H 5/33
USPC .................. 89/36.02, 36.05, 36.07
See application file for complete search history.

(56) References Cited

U.S. PATENT DOCUMENTS

| | | | | |
|---|---|---|---|---|
| 1,574,188 A * | 2/1926 | Friedman | ............... | F41H 1/02 109/82 |
| 3,745,938 A * | 7/1973 | Hathaway | ............... | F41H 5/08 109/49.5 |
| 5,329,636 A * | 7/1994 | Siddle | ............... | F41H 5/08 2/2.5 |
| 5,377,577 A * | 1/1995 | Bounkong | ............... | F41H 5/08 2/2.5 |
| 5,392,686 A * | 2/1995 | Sankar | ............... | F41H 5/08 109/49.5 |
| 6,131,524 A * | 10/2000 | Nepper, Sr. | ............... | F41H 5/08 109/49.5 |
| 6,161,462 A * | 12/2000 | Michaelson | ............... | F41H 5/06 102/303 |
| 6,367,427 B1 * | 4/2002 | Canady | ............... | A61F 5/05825 119/857 |
| 6,704,934 B2 * | 3/2004 | Graham | ............... | F41H 1/02 2/2.5 |
| 7,302,880 B1 * | 12/2007 | Elasic | ............... | F41H 5/08 89/36.01 |
| 7,549,366 B2 * | 6/2009 | Park | ............... | F41H 5/0435 428/301.1 |
| 8,176,830 B1 * | 5/2012 | Tan | ............... | F41H 5/0428 89/36.02 |
| 8,210,088 B1 * | 7/2012 | Keyfauver | ............... | F41H 5/08 89/36.05 |

(Continued)

*Primary Examiner* — Joshua E Freeman
(74) *Attorney, Agent, or Firm* — Dunlap Bennett & Ludwig PLLC

(57) ABSTRACT

An armor shield. The arm shield includes a ballistic material layer and a fabric layer. The fabric layer snuggly encases the ballistic material layer. The ballistic material layer and the fabric layer form a front side, a rear side, and an edge of the armor shield. A least one looped handle may be secured to the rear side.

17 Claims, 4 Drawing Sheets

(56) References Cited

U.S. PATENT DOCUMENTS

| | | | | |
|---|---|---|---|---|
| 8,356,540 B2* | 1/2013 | Priebe | F41H 5/08 | 89/36.01 |
| 8,408,114 B1* | 4/2013 | Tan | F41H 5/0428 | 102/200 |
| 8,418,595 B1* | 4/2013 | Saucedo | F41H 5/26 | 89/36.01 |
| 9,726,458 B2* | 8/2017 | Weekly | F41H 1/02 | |
| 2007/0125224 A1* | 6/2007 | Thomas | F41H 5/08 | 89/36.07 |
| 2007/0283477 A1* | 12/2007 | Dovner | F41C 33/0209 | 2/2.5 |
| 2010/0251883 A1* | 10/2010 | Naroditsky | B60N 2/4242 | 89/36.02 |
| 2011/0214559 A1* | 9/2011 | Lampo | B32B 37/00 | 89/36.02 |
| 2012/0006453 A1* | 1/2012 | Clayton | F41H 5/08 | 150/154 |
| 2012/0180636 A1* | 7/2012 | Seuk | F41H 5/08 | 89/36.07 |
| 2013/0098234 A1* | 4/2013 | Armellino, Jr. | F41H 5/08 | 89/36.05 |
| 2013/0205983 A1* | 8/2013 | Martin | F41H 5/013 | 89/36.07 |
| 2014/0224109 A1* | 8/2014 | Chandler | F41H 5/08 | 89/36.07 |
| 2014/0251122 A1* | 9/2014 | Adams | F41H 5/08 | 89/36.07 |
| 2015/0233679 A1* | 8/2015 | Seabrook | F41H 5/08 | 89/36.07 |
| 2015/0268009 A1* | 9/2015 | Tunis, III | B43L 1/00 | 89/36.02 |
| 2015/0338193 A1* | 11/2015 | Walker | F41H 1/02 | 89/36.02 |
| 2016/0102950 A1* | 4/2016 | Strauss | B26D 1/045 | 89/36.02 |
| 2016/0273883 A1* | 9/2016 | Weekly | F41H 1/02 | |
| 2017/0307339 A1* | 10/2017 | Bahu | F41H 5/08 | |

* cited by examiner

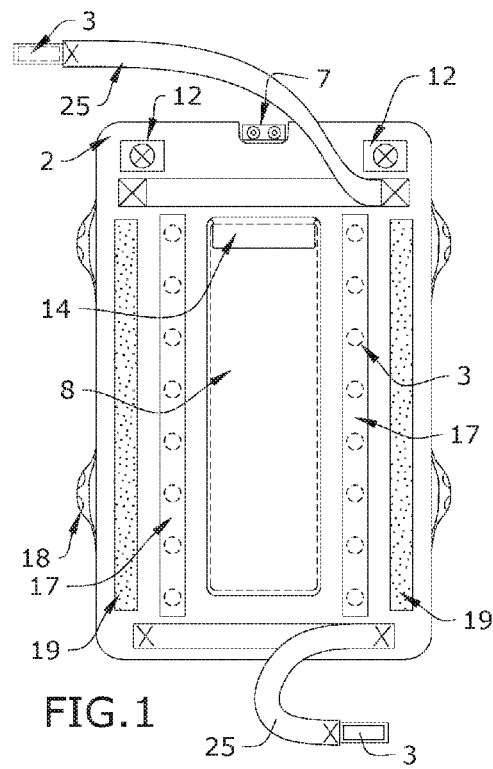
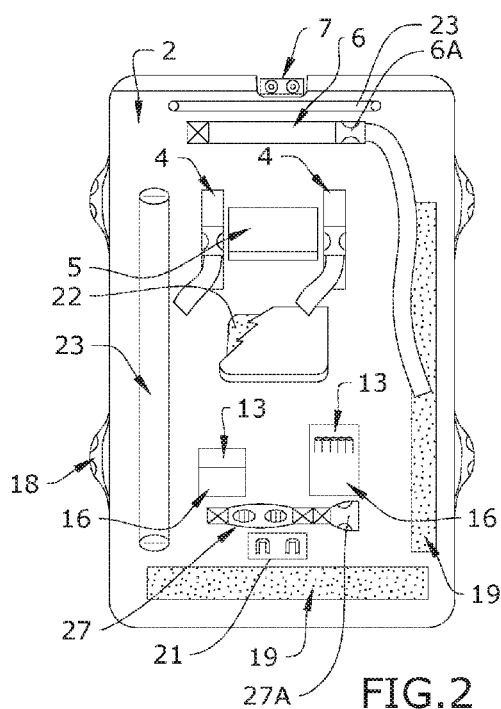
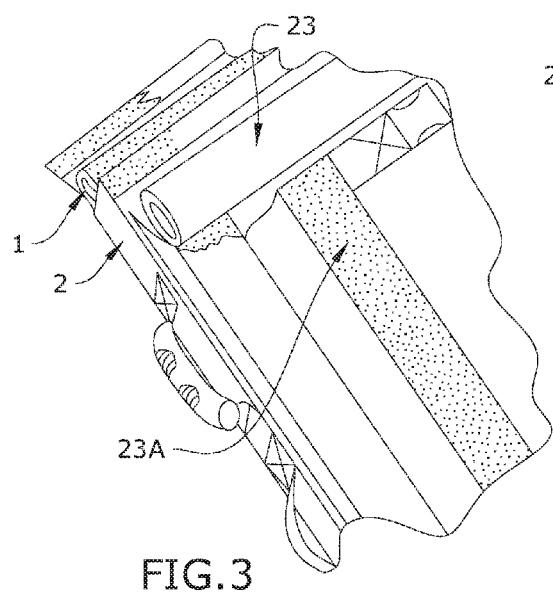
FIG.1
FIG.2
FIG.3

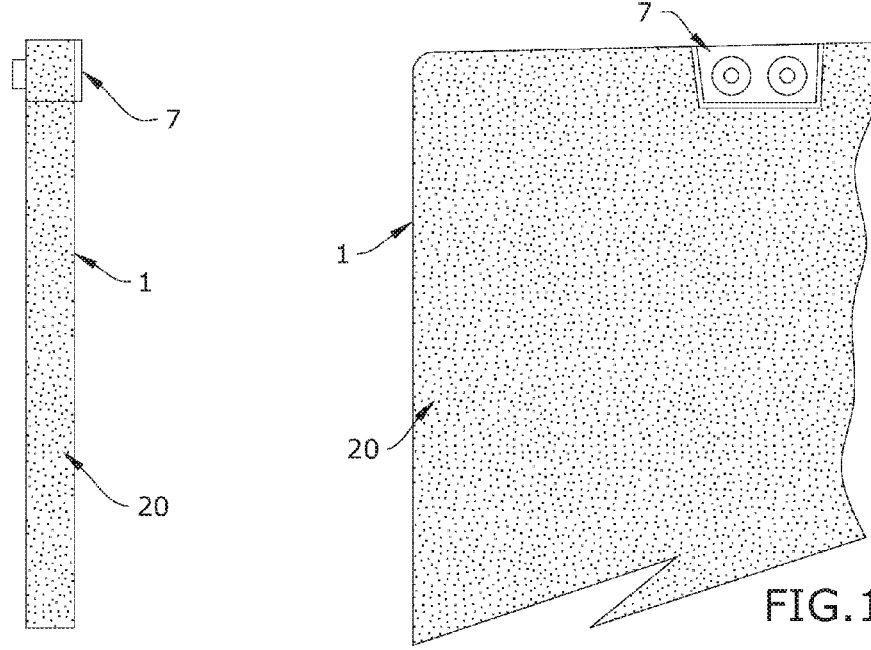
FIG.11A
FIG.11B
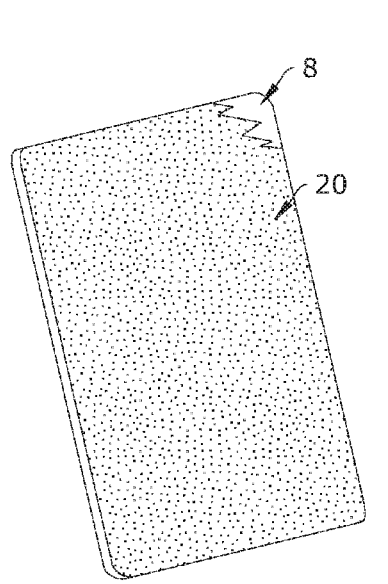
FIG.12
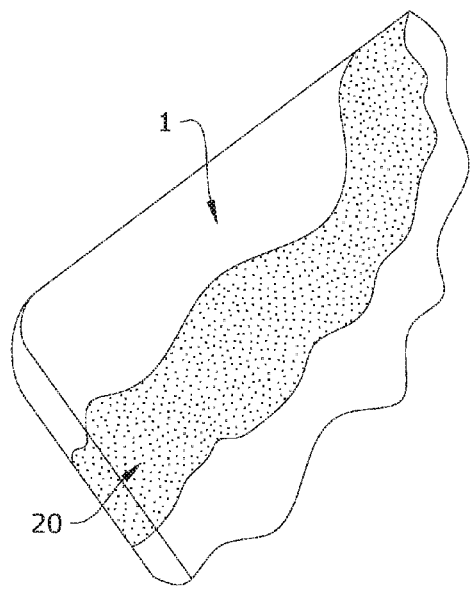
FIG.13

LIGHTWEIGHT HANDHELD ARMOR SHIELD

CROSS-REFERENCE TO RELATED APPLICATION

This application claims the benefit of priority of U.S. provisional application No. 62/327,813, filed Apr. 26, 2016, the contents of which are herein incorporated by reference.

BACKGROUND OF THE INVENTION

The present invention relates to an armor shield and, more particularly, to lightweight and effective armor shield.

Armor shields offered today in the market place are heavy, and as a result when carried for extended periods of time, encumbers the activities of the user. The current armor shields used are ceramic based plates, which are heavy. These armor shield products are intended to be used by individuals in dangerous and high stress situations during planned or unexpected high tension encounters. Current armor shields weigh around 40 lbs and cause fatigue to a user. Further, ceramic plates are consistently unreliable as they are proven to fail multi-hit firings that will cause injuries and fatalities under any condition. Weight, ballistic integrity and cost all contribute to the challenges of creating an optimal design configuration that protects life and prevents injury.

As can be seen, there is a need for an improved lightweight armor shield.

SUMMARY OF THE INVENTION

In one aspect of the present invention, an armor shield comprises: a ballistic material layer; a fabric layer snuggly encasing the ballistic material layer, wherein the ballistic material layer and the fabric layer form a front side, a rear side, and an edge of the armor shield; and at least one looped handle secured to the rear side.

These and other features, aspects and advantages of the present invention will become better understood with reference to the following drawings, description and claims.

BRIEF DESCRIPTION OF THE DRAWINGS

FIG. 1 is a front view of an embodiment of the present invention;

FIG. 2 is a rear view of an embodiment of the present invention;

FIG. 3 is a section detail view of an embodiment of the present invention;

FIG. 11A is a side view of a ballistic material layer of an embodiment of the present invention;

FIG. 11B is section detail view of a ballistic material layer of an embodiment of the present invention;

FIG. 12 is perspective view of a steel plate of an embodiment of the present invention; and FIG. 13 is section detail view of a steel plate of an embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes an armor shield including an armored shield. The armored shield is able to resist heat, flames and blast due to the fire resistant protective coating. The armored shield is tightly enclosed in the carrier by pockets and hook and loop closures. The carrier is sewn to fit tightly in all dimensions. The carrier incorporates multiple hand straps with arm pads to allow the entire assembly to be carried comfortably by one person using one arm, horizontally or vertically. The sling straps are provided to allow over shoulder carrying of the assembly. The straps may include magnet pockets at their tips to attach the shield magnetically to an area, such as glass windows on a vehicle. The straps would hold the assembly on the vehicle by attaching to adjacent steel panels. Using auxiliary pockets, an upgradable ballistic insert can be attached to center of the shield to further enhance protection of vital organs. The medical vitals transducer is worn on the body and transmit its data and GPS location via BLUETOOTH® to the fully networked tablet computer. This data is monitored by a remote command at a central location, giving real time information on the condition and location of the officer. Embedded in the top edge of the shield is the thermal camera system, which allows scanning in front of the shield without exposing the user to live fire. It has enhanced capability to use normal visible light with the thermal image. Images are transmitted via BLUETOOTH® to the tablet computer attached to the rear of the shield via hook and loop fasteners. Layered in top of the carrier assembly is an instant flotation device, manually triggered, which allows the shield to be used for rescue operations. Side mounted handles are used to accommodate the use of the shield as a bullet resistant litter. Multiple attachment points allow shields to be used together in a group when a larger surface area to be protected is required.

Figure 4:
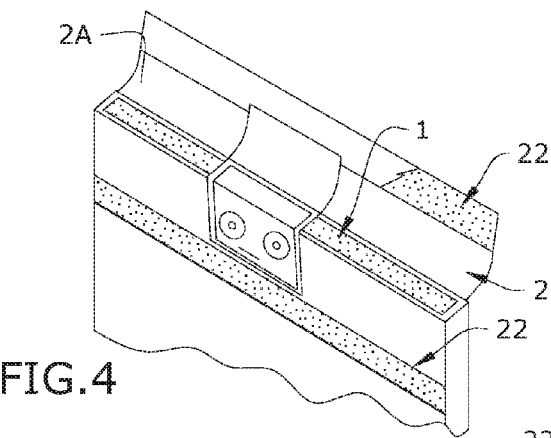
FIG. 4 is a section detail view of an embodiment of the present invention.
Figure 5:
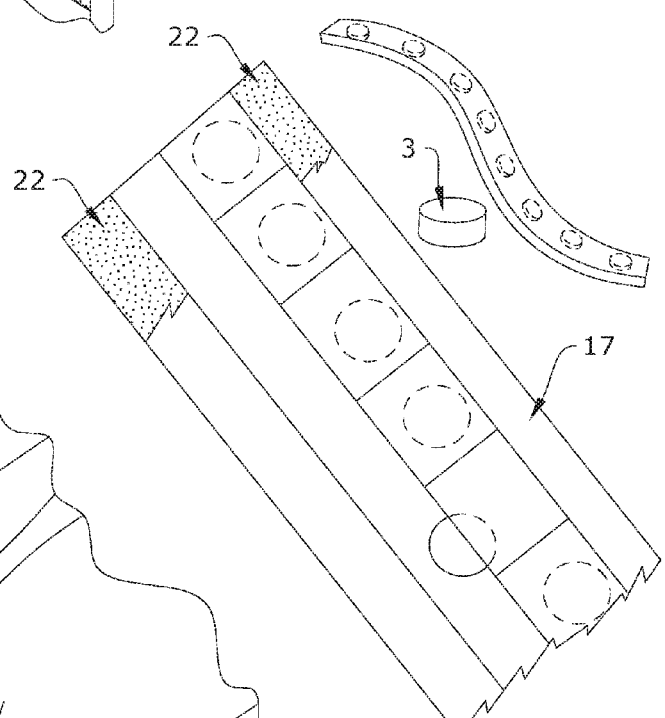
FIG. 5 is a section detail view of an embodiment of the present invention.
Figure 6:
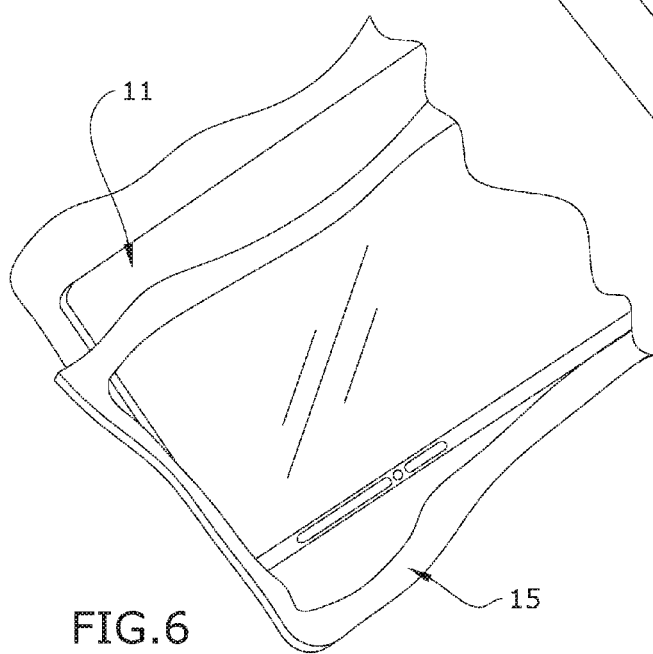
FIG. 6 is a section detail view of an embodiment of the present invention.
Figure 7A:
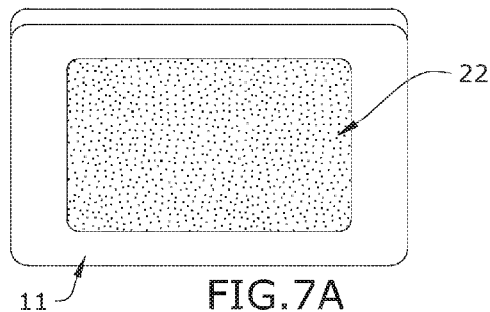
FIG. 7A is a rear view of a tablet of an embodiment of the present invention.
Figure 7B:
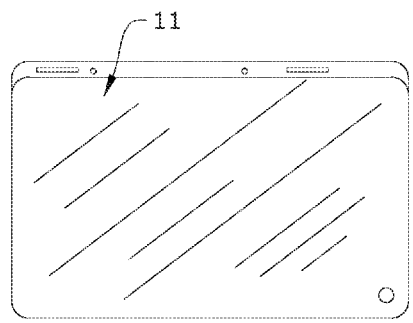
FIG. 7B is a front view of a tablet of an embodiment of the present invention.
Figure 8A:
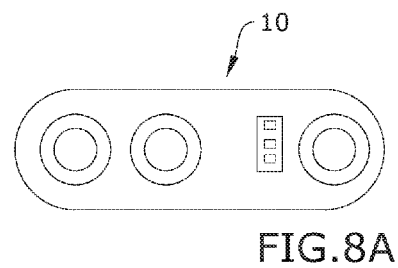
FIG. 8A is a rear view of a vital medical transducer of an embodiment of the present invention.
Figure 8B:
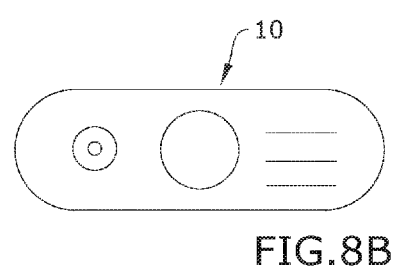
FIG. 8B is a front view of a vital medical transducer of an embodiment of the present invention.
Figure 9:
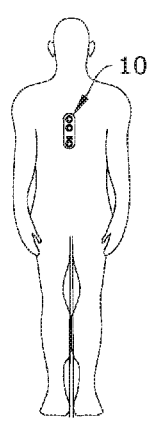
FIG. 9 is a front view of a vital medical transducer of an embodiment of the present invention in use.
Figure 10:
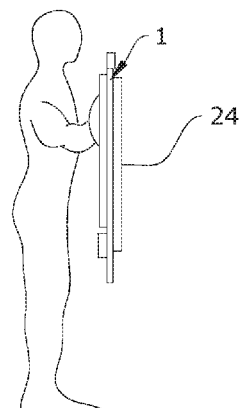
FIG. 10 is a side view of an embodiment of the present invention in use.

Referring to FIGS. 1 through 13, the present invention includes an armor shield. The arm shield includes a ballistic material layer 1 and a fabric layer 2. The fabric layer 2 snuggly encases the ballistic material layer 1. The fabric layer 2 may include a sleeve or carrier with a flap 2a. The ballistic material layer 1 may be inserted into the sleeve and the flap 2a may be closed by hook and loop fasteners 22. The fabric layer 2 may include a fire-resistant canvas or nylon material. The ballistic material layer 1 and the fabric layer 2 form a front side, a rear side, and an edge of the armor shield. A least one looped handle 4 may be secured to the rear side.

The ballistic material layer 1 of the present invention may be a polyethylene, a ballistic fiberglass, an aluminum foam, a liquid, such as a shear thickening fluid or a magnetorheological fluid, or a combination thereof. The polyethylene may be an ultra-high-molecular-weight polyethylene UHMWPE compressed unidirectional fabric board resin. The present invention may utilize about 50 layers up to about 68 layers, such as about 62 layers, of the ballistic material layer 1. For example, the present invention may include 62 layers of the ultra-high-molecular-weight polyethylene UHMWPE compressed unidirectional fabric board resin. The ballistic material layer 1 may be a floatable material and act as a floatation device if necessary.

The present invention may further include a spray on fire resistance layer 20. The fire resistance layer 20 may be directly applied to the ballistic material layer 1. The fire resistance layer 20 may include a self-catalyzing polyurethane coating. The fire resistance layer 20 may surround the ballistic material layer 1.

The at least one handle 4 may include a first handle 4 and a second handle 4 having aligned loops and adjustable straps operable to adjust the size of the loops. A padding 5 may be secured to the rear side in between the first handle 4 and the second handle 4. A user may comfortably place their arm within the aligned loops, with the padding 5 is disposed in between the arm and the armor shield. A bottom portion of the rear side may include a pair of hooks 21. The pair of hooks 21 may secure to a user's belt or waist band, which may help alleviate some of the weight of the armor shield from the user's arm.

The armor shield may further include a plurality of magnets 3, such as rare earth magnets, attached to the front or rear side. The magnets 3 allow users to attach the armor shield to objects. For example, the magnets 3 may be used to attach the armor shield to a car door to provide addition protection. In certain embodiments, the present invention may include a pair of bandoleers 17. The bandoleers 17 may include a plurality of pockets each having a magnet 3 within. The bandoleers 17 may be releasably attachable to the front side of the armor shield. For example, the front side of the armor shield may include one of a hook and loop fastener and the bandoleers 17 may include the other of the hook and loop fastener. The bandoleers 17 may thereby releasably attach to the front side of the armor shield.

The present invention may further include straps 25, such as a first strap 25 and a second strap 25. Each of the straps 25 include a first end and a second end. The first end of the first strap 25 may be sewn to a top portion of the front side and the first end of the second strap 25 may be sewn to a bottom portion of the front side. Each of the second ends of the straps 25 may include strong magnets 3. The straps 25 allow the armor shield to be attached to additional objects. For example, the straps 25 may attach to a roof of a car while the armor shield may hang and cover the windshield.

The armor shield may further include carrying devices while the armor shield is not in use. For example, the present invention may include a plurality of looped handles 18 secured to the edge. The present invention may further include a bottom handle 27 secured to a bottom portion of the rear side. The bottom handle may include a first buckle portion 25a. The present invention may further include a shoulder sling 6. The shoulder sling 6 includes an adjustable strap attached to the rear side. The shoulder sling 6 further includes a second buckle portion 6a. When the shoulder sling 6 is in use, the adjustable strap may be extended so that the second buckle portion 6a may snap into the first buckle portion 25a. A user may then place the shoulder sling 6 over their shoulder and transport the armor shield.

The present invention may further include a shield interconnecting system. The shield interconnecting system may include a rolled sleeve 23 secured to a first side and a top portion of the rear side of the armor shield. The rolled sleeve 23 may include a first connector 23a. A second connector 19 may be secured to the second side and the bottom portion of the rear side of the armor shield. The rolled sleeves 23 are operable to unroll so that the first connector 23a connects to the second connector 19 of a second armor shield, thereby linking the armored shields together. In certain embodiments, the front side may also include the second connectors 19. The first connectors 23a and the second connectors 19 may be strips of hook and loop fasteners, buckles, clips and the like.

In certain embodiments, the present invention may include lights 12 attached to the front side. The lights 12 may be light emitting diodes (LEDs) and may be attached to battery packs 16 disposed within auxiliary pockets 13 of the armor shield. The LED lighting systems are attached to the front side of the shield, with a switch attached to the rear side of shield near the handles 4 for easy access.

The present invention may further include a visual system. A thermal camera 7 may be secured to the armored shield and is directed to capture images in front of the front side. A screen 11 is attached to the rear side. The thermal camera 7 streams video on the screen 11. The screen 11 may be a tablet or other smart device. The screen 11 may attach to the rear side by a hook and loop fastener 22 or may be disposed within a pocket 15.

The armor shield may further include additional layers of removeable shield. For example, a pocket 14 may be secured to the front side. A ballistic insert 8 may be placed within the pocket 14. The pocket 14 may be centrally located on the front side so that the ballistic insert 8 further protects the vitals of the user. The ballistic insert 8 may be made of the same materials as the ballistic material layer 1. The present invention may further include a metal shield 24. The metal shield 24 may be secured to the magnets 3 disposed on the front side of the armor shield. Each of the metal shield 24 and the ballistic insert 8 may be treated with the spray on fire resistance layer 20.

The present invention may include a medical vitals transduce 10. The medical vitals transducer 10 is attached to the user and takes the user's vitals data. The medical vitals transducer 10 may attached to the chest or wrist of the user and transmits vital medical data such as heart rate, breathing rate etc. to a central command for analysis. The data is relayed through the tablet computer via networking software. The transducer 10 may further include a global positioning system (GPS) which transmits the location of the user to the remote central command. The transducer 10 may first send the data via BLUETOOTH® to the fully networked tablet computer and the tablet may send the data to the remote central command.

It should be understood, of course, that the foregoing relates to exemplary embodiments of the invention and that modifications may be made without departing from the spirit and scope of the invention as set forth in the following claims.

What is claimed is:
1. An armor shield comprising:
a ballistic material layer;

a fabric layer snuggly encasing the ballistic material layer, wherein the ballistic material layer and the fabric layer form a front side, a rear side, and an edge of the armor shield;

at least one looped handle secured to the rear side;

a rolled sleeve secured to a first side of at least one of the front side, the rear side and the edge, wherein the rolled sleeve comprises a first connector; and a second connector secured to a second side of one of the front side, the rear side and the edge, wherein the rolled sleeve is configured to unroll so that the first connector connects to the second connector of a second armor shield.

2. The armor shield of claim 1, wherein the ballistic material layer is a polyethylene.

3. The armor shield of claim 2, wherein the polyethylene is an ultra-high-molecular-weight polyethylene compressed unidirectional fabric board resin.

4. The armor shield of claim 1, further comprising a fire resistance layer covering the ballistic material layer.

5. The armor shield of claim 4, wherein the fire resistance layer comprises a self-catalyzing polyurethane coating.

6. The armor shield of claim 1, further comprising a plurality of magnets attached to the front side.

7. The armor shield of claim 6, wherein the plurality of magnets are disposed within a pair of bandoleers releasably attached to the front side.

8. The armor shield of claim 1, further comprising at least one strap comprising a first end and a second end, wherein the first end is attached to the front side and the second end comprises a magnet.

9. The armor shield of claim 8, wherein the at least one strap comprises a first strap attached to a top portion of the front side and a second strap attached to a bottom portion of the front side.

10. The armor shield of claim 1, further comprising a plurality of handles secured to the edge.

11. The armor shield of claim 1, wherein the first connector and the second connector are a hook and loop fastener.

12. The armor shield of claim 1, further comprising at least one light secured to the front side and a battery pack powering the at least one light.

13. The armor shield of claim 1, further comprising at least one hook secured to a bottom portion of the rear side.

14. The armor shield of claim 1, further comprising a visual system comprising:
    a thermal camera directed to capture images in front of the front side; and
    a screen attached to the rear side, wherein the thermal camera streams video on the screen.

15. The armor shield of claim 1, further comprising a pocket secured to the front side, wherein a second ballistic material layer is disposed within the pocket.

16. The armor shield of claim 1, wherein the at least one handle comprises a first handle and a second handle comprising aligned loops and adjustable straps operable to adjust the size of the loops.

17. The armor shield of claim 1, further comprising a shoulder sling comprising:
    a first buckle portion attached to the rear side; and
    an adjustable strap attached to the rear side and comprising a second buckle portion connectable to the first buckle portion.

* * * * *